Oct. 25, 1927.     1,646,617
H. KOLLER
COMBINED REAR AUTOMOBILE WINDOW AND WARNING SIGNAL
Filed July 26, 1924

INVENTOR
Henry Koller
BY
His ATTORNEYS

Patented Oct. 25, 1927.

1,646,617

UNITED STATES PATENT OFFICE.

HENRY KOLLER, OF CHICAGO, ILLINOIS.

COMBINED REAR AUTOMOBILE WINDOW AND WARNING SIGNAL.

Application filed July 26, 1924. Serial No. 728,346.

My invention relates to a window which I have designed and invented for use in the particular form hereinafter described as the rear window commonly employed at the back of closed automobile bodies, such as sedans and coupés, though it may be used in a similar manner at the rear of any other kind of vehicle, as for instance trucks, autobusses, railway cars, etc. The object of my invention is the provision, as part of such window, of a reflecting device which will attract attention, give a warning to the drivers of other automobiles approaching from the rear, so that collisions and accidents may be avoided. With this object in view I have invented this novel window herein described and illustrated, the essential elements of my invention being more particularly pointed out in the appended claims.

Figure 1:
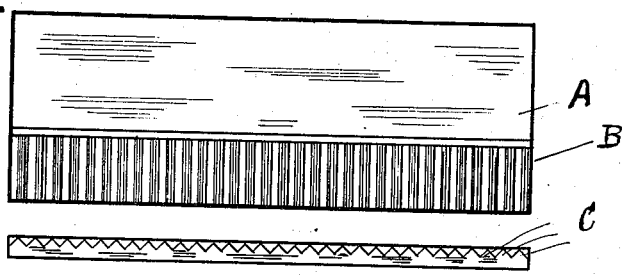
Figure 2:
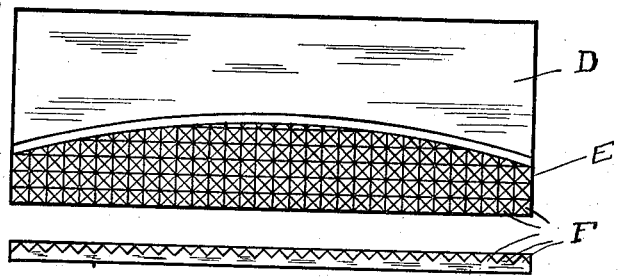
Figure 3:
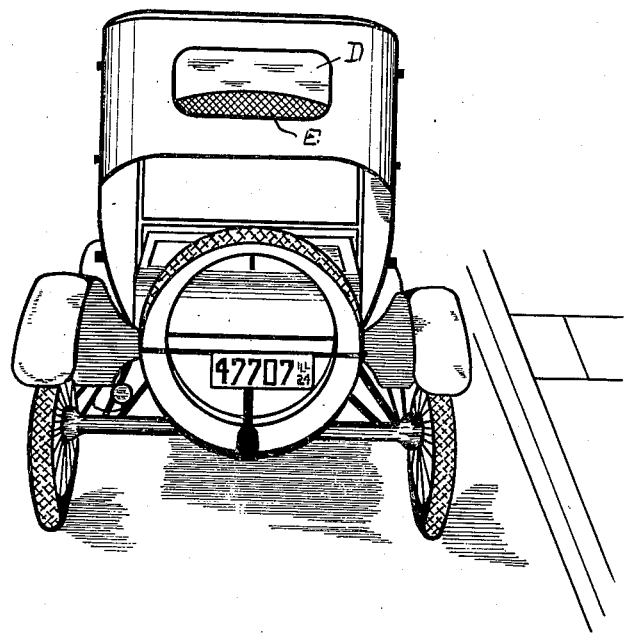

In the drawing I have illustrated two different embodiments of my invention, Figure 1 being a face view of one form together with a longitudinal cross-section through the lower portion of the same; Fig. 2 a face view of another form, with a similar cross-section, and Fig. 3 a rear view of a closed car, showing the form of my invention illustrated in Figure 2 applied thereto.

The same letters of reference indicate the same parts in the different figures of the drawing.

It will be understood that windows embodying my invention are formed of glass and are mounted in the usual manner in framed openings at the rear; the upper portion A of the window is of clear, uncolored glass, affording light to the interior of the vehicle and permitting a view therethrough. Below the clear portion A is a colored portion B, preferably integrally united to the clear portion A, although it may be formed separately and the two parts secured together in any suitable manner. The inner face of this portion B,—that is, the side toward the front of the car, is silvered to make such portion a rearwardly facing colored mirror. The color of the portion B is preferably red, inasmuch as red is the conventional color for a warning or danger signal, and its significance is universally understood, although any other color may be employed and, as the warning is conveyed by notice of the signal and is not dependent upon its color, other colors than red will serve the purpose in view.

Preferably the outer face of the portion B is formed with prismatic faces or facets which will serve to break up the light thrown upon the window by the headlights of a car approaching from the rear and reflect it in brilliant beams which are calculated to attract the attention of the driver of the approaching car. In the form of my invention illustrated in Fig. 1, the portion B is formed with vertical prismatic ribs C, and in the form shown in Fig. 2, below the clear glass portion D, corresponding to the portion A of the form shown in Fig. 1, is arranged the colored portion E, of slightly different shape from the portion B, which is formed with pyramidal projections F having triangular faces which produce a very brilliant sparkling effect in reflecting back the light from an approaching car.

It will be understood that my invention may be varied in detail, and that some measure of the advantages of my invention may be attained by using a colored lower portion of glass having a plane surface or a surface broken by cylindrical projections and depressions, although I consider the sparkling brilliant appearance of the faceted surfaces hereinbefore described as more conspicuous and better calculated to attract attention and convey the desired warning. It will further be understood that while the silvering of the back of the colored portion is highly desirable and is preferable, an unsilvered portion, especially if provided with faceted reflecting faces, will in considerable measure serve the ends in view, and that I regard such variations as within the scope of my invention, in its broader aspect.

I claim:

1. A window for automobiles and the like having a transparent upper portion and a lower reflecting portion silvered on its inner face and having an outer face formed with broken reflecting faces.

2. A window for automobiles and the like having a transparent upper portion and a lower reflecting portion silvered on its inner face and having a faceted outer face.

3. A window for automobiles and the like having a clear uncolored main portion and a colored marginal reflecting portion silvered on its inner face and having an outer face formed with broken reflecting faces.

HENRY KOLLER.